(12) United States Patent
Erdmann et al.

(10) Patent No.: US 10,264,435 B2
(45) Date of Patent: Apr. 16, 2019

(54) METHOD AND APPARATUS FOR PROVIDING ACKNOWLEDGEMENT INDICATORS IN A WIRELESS COMMUNICATION NETWORK

(71) Applicant: SIGNIFY HOLDING B.V., Eindhoven (NL)

(72) Inventors: Bozena Erdmann, Eindhoven (NL); Koen Johanna Guillaume Holtman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/741,275

(22) PCT Filed: Jun. 30, 2016

(86) PCT No.: PCT/EP2016/065319
§ 371 (c)(1),
(2) Date: Dec. 31, 2017

(87) PCT Pub. No.: WO2017/005599
PCT Pub. Date: Jan. 12, 2017

(65) Prior Publication Data
US 2018/0206095 A1    Jul. 19, 2018

(30) Foreign Application Priority Data
Jul. 9, 2015    (EP) .................................... 15176178

(51) Int. Cl.
*H04W 4/80*    (2018.01)
*G08C 17/00*    (2006.01)
*H04W 52/02*    (2009.01)

(52) U.S. Cl.
CPC .............. *H04W 4/80* (2018.02); *G08C 17/00* (2013.01); *H04W 52/0209* (2013.01)

(58) Field of Classification Search
CPC ....................................................... H04W 4/80
See application file for complete search history.

(56) References Cited

U.S. PATENT DOCUMENTS 5,741,306 A * 4/1998 Glegyak .................. A61N 1/39
607/12
5,881,158 A * 3/1999 Lesinski .............. H04R 19/016
381/174

(Continued)

FOREIGN PATENT DOCUMENTS

KR    20000025436 A    5/2000
WO    2007036818 A1    4/2007

(Continued)

*Primary Examiner* — Hsinchun Liao

(57) ABSTRACT

The invention relates to a user-operated device, a method and computer program for providing acknowledgement indicators performed by a user-operated device within a communication network. The user-operated device for receiving user input to trigger in a user-perceivable reaction of the user-operated device or a system controlled by it, the user-operated comprising means for detecting an actuation pattern of the user-operated device upon actuation of a user; means for comparing the detected actuation pattern with a predetermined pattern; and means for generating an acknowledgement indicator in dependence of a comparison result of the actuation pattern with the predetermined pattern.

8 Claims, 2 Drawing Sheets

(56) References Cited

U.S. PATENT DOCUMENTS

| | | |
|---|---|---|
| 2007/0171849 A1 | 7/2007 | Zhang et al. |
| 2009/0109917 A1 | 4/2009 | Pajukoski et al. |
| 2010/0105446 A1* | 4/2010 | Charlier .............. H04M 1/6066 455/569.1 |

FOREIGN PATENT DOCUMENTS

| | | |
|---|---|---|
| WO | 2012052964 A1 | 4/2012 |
| WO | 2014187672 A1 | 11/2014 |

* cited by examiner

METHOD AND APPARATUS FOR PROVIDING ACKNOWLEDGEMENT INDICATORS IN A WIRELESS COMMUNICATION NETWORK

Cross-Reference to Prior Applications

This application is the U.S. National Phase application under 35 U.S.C. § 371 of International Application No. PCT/EP2016/065319, filed on Jun. 30, 2016 which claims the benefit of European Patent Application No. 15176178.0, filed on Jul. 9, 2015. These applications are hereby incorporated by reference herein.

FIELD OF THE INVENTION

The present invention relates to the field of communication networks in which user input is received by a user-operated device to trigger a reaction perceivable by the user. Such user operated device may be—but is not limited to—a resource restricted device, such as a ZigBee Green Power Device (ZGPD). In particular, the invention relates to the provision of a (negative) acknowledgement indicator based on actuation patterns.

BACKGROUND OF THE INVENTION

In many communications networks, the communication protocol foresees a "Negative-Acknowledgment" (NACK) protocol message sent to negatively acknowledge or reject a previously received message, or to indicate some kind of error. Wherein acknowledgement (ACK)-based communication networks positively acknowledge receipt of messages, e.g. the Transmission Control Protocol (TCP) is an example of an ACK-based protocol, other protocols are NACK-based, meaning that they only respond to messages if there is a problem. Examples include most reliable multicast protocols which send a NACK when the receiver detects missing packets. An exemplary system providing ACK and NACK indicators is described in US 2009/0109917.

However, sometimes a device may not be able to send or receive such ACK/NACK protocol messages, or be very limited in their ability to do so. For instance, in network systems according to—but not limited to—the ZigBee specification, especially the ZigBee Green Power (GP) specification, resource restricted devices, such as ZigBee Green Power Devices (ZGPD) may only be powered by batteries with small capacity or by energy harvesting. Such devices are heavily restricted in the available amount of energy, which limits their offered functionality and influences the network operation, commissioning and maintenance. Thus, a resource restricted device can often transmit and/or receive only at unscheduled opportunities, e.g. after it has been actuated by a user. One example of such a resource restricted device is a battery-less switch that can only transmit for a short time once it has been actuated by a user, but has no reception capability. Another example of a resource restricted device is a battery-less switch that can receive for a short time once it has transmitted a signal upon actuation by a user. Yet another example of a resource restricted device is a periodically-reporting sensor, harvesting energy from its environment, e.g., by means of a photovoltaic cell, with or without reception capabilities. The amount of energy harvesting performed by an energy harvesting resource restricted device is usually optimized for application specific needs and/or user requirements. For example, for energy-harvesting pushbutton switches, activated by a user operation, the force and depth required to actuate a switch button (i.e. how hard and far the user has to press) are an important acceptance factor. As benchmark conventional systems may be used for mechanically switching mains power. Switch buttons in a mechanically switching mains power network may be operated rather effortlessly. In order to provide such effortless operation, the amount of energy harvested by a switch button is rather small. Thus, even though the GP specification offers bidirectional communication functionality, some user-operated devices, in particular energy-harvesting devices may not have the energy budget to use it.

The bidirectional communication with a ZGPD included in the GP specification is dedicated to sending a message to the ZGPD in a short time window that closely follows the sending of a broadcast packet by the ZGPD. The ZGPD is only able to receive a message during this time window. The destination device(s), i.e. the devices controllable by the ZGPD, select(s) a TempMaster from among the device forwarding a Green Power Device Frame (GPDF) with sequence number N and a flag enabling receiving after transmitting (RxAfterTx=true). The devices forwarding the GPDF can be proxy devices, i.e. device dedicated to multi-hop communication extension between the ZGPD(s) and the destination device(s) and/or the destination devices capable of forwarding. The TempMaster deliver(s) the message to the ZGPD, in the original GP specification (at least) 5 ms, in the current GP specification between 20 and 25 ms, after the reception of the next GPDF (sequence number >=N+1) with RxAfterTx=true. Thus, there is a delay between the message generation and message delivery. This mechanism was meant to be used for infrequent events, like channel or key update. But it was not meant for an acknowledgement, with the acknowledgement acting as a signal to the ZGPD that communication failures of a certain type are currently absent. Assuming now a very tight energy budget, it is often preferred to spend the available energy on several attempts of transmission (in broadcast mode—i.e. to multiple potential receivers), rather than on (sending in unicast mode to a particular receiver and) waiting for an acknowledgement, since the system may have no energy to act upon lack of acknowledgement at the timeout and since in most wireless systems, listening has the same, or even higher, cost as/than transmitting.

Even if enough energy is available to listen for acknowledgements, there are still issues to take into account. For instance, a device may miss a single expected ACK due to: temporary channel fading, short-duration noise, long-duration noise, network changed channel, network changed security key, the previous TempMaster is no longer in range, due to movement of the TempMaster and/or the ZGPD, etc. If the cause is temporary channel fading, the best recovery strategy is to re-send the signal on the same channel, when there is still energy available. If the network changed the security key, the best strategy may be to start a key recover procedure, such as a commissioning procedure. This may require several communication steps and/or user involvement. If the cause is that the network changed channel, the best strategy is to search all channels until the network channel is found again. However, scanning all channels may require a lot of energy, such that the decision to start a channel search should not be taken lightly. If multiple ACKs are missed in a row, the device may exclude some short-term causes first. However, the problem of deciding when to give up re-trying and enter a channel search process remains. Thus, it would be beneficial if an extra signal was available, beyond the missing of several ACKs, by which the device can unambiguously detect a particular type of communication failure.

Accordingly, the transmit-only-behaviour with a plurality of retries is fine as long as the GPDF non-reception is caused by a temporary problem, like interference, fading (which will disappear by themselves) or portability/proxy switching (which will be resolved by the GP network protocol, automatically configuring new proxy devices). However, if the network parameters (e.g. key, channel) have changed during a period of time in which the resource restricted device was not operational, the resource restricted device will have no means of discovering the parameter change, esp. a channel change. In such a case, even the network will most likely not have means for discovering the problem, since it will no longer receive the resource restricted device's messages on the old channel, in particular, if the device is communicating aperiodically (e.g. a user operated device, such as e.g. a light switch, or a device whose transmission intervals depend on the amount of energy available (harvested), e.g. a sensor powered by a small solar cell, or flow). In such constellations, the system does not know when to expect any message from the resource restricted device and therefore cannot reliably detect when it is lost.

SUMMARY OF THE INVENTION

It is an object of the present invention to improve communication robustness between a user-operated device and a destination device within a communication network while optimizing power consumption of user-operated devices.

In an aspect of the invention there is provided a user-operated device for use in a wireless acknowledgement-based communication network for receiving user input to trigger in a user-perceivable reaction of the user-operated device or a system controlled by it The user-operated device comprises means for detecting an actuation pattern of the user-operated device upon actuation of a user, means for comparing the detected actuation pattern with a predetermined pattern and means for generating an acknowledgement indicator in dependence of a comparison result of the actuation pattern with the predetermined pattern, wherein the user-operated device is a resource restricted device providing control commands over the wireless acknowledgement-based communication network to a destination device upon actuation by a user. The user-operated device may be a stand-alone user-operated device, such as a PC, a tablet, a smartphone etc. which is communicatively connected to servers or other devices within a network. The user-operated device may also be a resource restricted device used in a network, such as—but not limited to—a ZigBee Green Power network. Actuation of the user-operated device by the user may comprise any interaction of the user with the user-operated device, including voice commands, input via mouse, keyboard or any other control device. If the user-operated device is a light switch implemented as a ZGPD, the user can actuate it by pressing it. Depending on the specific application a variety of actuation patterns may be defined. Taking the example of a light switch as user-operated device, actuation pattern may be a single press of the switch, two presses in a row with less than 2 seconds passing in between, press force within a particular threshold, press force above a particular threshold. Generally any measurable input, such as press duration, press frequency, press distance, rotation speed, rotation angle, rotation direction or any combination thereof can be used to define actuation patterns. Further, for energy harvesting devices, the current status of the energy storage can be further taken into account, which may be indicative of time interval to or strength of the previous user actuation.

The present invention provides an approach in which a particular usage pattern of a user-operated device is utilized to provide a (N)ACK indication, e.g. to indicate that resubmission of a signal is not required in case of a positive acknowledgement or to automatically trigger a particular action in case of negative acknowledgement. The acknowledgement indicator is therefore to be understood as being either a positive acknowledgement or a negative acknowledgement depending on the concrete implementation. Usually the user-operated device is actuated by a user to automatically perform some observable action, e.g. turn on/off or dim the light, select a scene, open/close/lock/unlock door/window/gate, trigger movement, e.g. a step of a conveyor belt, stop the conveyor belt, call for help, e.g. assistance in a hotel or hospital, (with audible and/or visible feedback) etc. There may also be user-perceivable actions whose direct effect is not instantly perceivable, e.g. increasing the temperature in the room. However, in these cases there may be some other perceivable feedback like feedback on a display or the user may hear that a process has been started e.g. hear the ventilator starting/stopping etc. Hence, usually a user will only actuate the user-operated device once and expect the perceivable feedback. If now, the perceivable, expected feedback to the user's actuation does not occur, the user will most likely retry one, two or even more times. In order to determine whether the user-operated device has been actuated in a typical or atypical manner, the user-operated device detects an actuation pattern and compares it with a predetermined pattern. The predetermined pattern may either be the expected typical pattern or an atypical pattern depending on the concrete implementation for a particular application. The user-operated device may then generate an acknowledgement indication, either positive or negative depending on the comparison between actuation pattern and predetermined pattern. This acknowledgement indication may thus be provided shortly after the user actuated the user-operated device. Accordingly, there is no need for the user-operated device to be operational. In particular, there is no need for the user-operated device to be in receive mode for a longer period in order to receive an acknowledgement from the network. In fact, the user-operated device may not even need the functionality of being able to receive acknowledgement indication transmissions from the network. In case the user-operable device is a resource restricted device, the resource restricted device may be a one-way communication device capable of transmission only, such as a light switch with no reception capability. A transmit-only resource restricted device could also be released from performing unnecessary transmission retries. Utilization of a usage pattern of a user-operated device to provide a (N)ACK indication would thus also enable a resource restricted device without reception capability to react appropriately on (non-)receipt of transmissions. Also resource restricted devices capable of bidirectional communication may be advantageously effected in that the pattern-based acknowledgement indicator may be used in addition to network based reception of acknowledgement indictors to identify the correct error source and help initialize the correct countermeasures as early as possible in order to comply with the restricted energy budget. For example, pattern-based acknowledgement indicator of success may overwrite the missing reception of acknowledgement, removing the need for any corrective action, as an indication of temporary local communication problems.

Pattern-based acknowledgement indicator of failure, combined with lack of acknowledgement, especially repetitive, may trigger a corrective action, such as scanning all channels. Pattern-based acknowledgement indicator of failure, combined with reception of acknowledgement, especially repetitive, may indicate system errors (e.g. a broken route on the way from the proxy to the destinations and/or disappearance of the destination); a corrective user action may be required.

In an embodiment of the present invention the predetermined pattern represents an atypical user interaction and the means for generating an acknowledgement indicator are adapted to triggering a maintenance action to recover from communication failures if the actuation pattern matches the predetermined pattern. In cases in which a specific atypical usage pattern can be mapped to a specific communication problem, e.g. network communication problem, it may be appropriate to define the atypical pattern as predetermined pattern and a corrective action, e.g.to recover from network failure, upon detection of a match between the actual pattern and the predetermined pattern.

In a further embodiment of the present invention the predetermined pattern represents a typical user interaction and the means for generating an acknowledgement indicator are adapted to triggering a maintenance action to recover from communication failures if the actuation pattern does not match the predetermined pattern. In cases in which a typical usage pattern can be defined and there may be a variety of possible atypical usage pattern it may be appropriate to define the typical pattern as predetermined pattern and trigger a maintenance action, e.g. to recover from network failure, upon detection of a mismatch between the predetermined pattern and the actual actuation pattern.

In a further embodiment of the present invention the means for detecting an actuation pattern comprise a capacitor adapted to store energy harvested during actuation of the user-operated device by a user and discharge at a predetermined rate; wherein the means for detecting an actuation pattern are further adapted to determine a residual charge in the capacitor upon actuation by a user. The means for generating an acknowledgement indicator are adapted to generate the acknowledgement indicator in dependence of a value of the residual charge. For instance, if a previous actuation has occurred shortly before the present actuation, this may define an atypical usage pattern. Hence, if the value of the residual charge is still above a predetermined value, the means for generating an acknowledgement indicator may generate a negative acknowledgement. Again, whether the acknowledgement is positive or negative depends on the concrete implementation according to the needs of a particular application.

In a further embodiment of the present invention the user-operated device further comprises means for providing user instructions in dependence of a comparison result of the actuation pattern with the predetermined pattern. In case the user-operated device detects an atypical usage pattern, instructions concerning the correct usage or a failure recovery procedure may be displayed to the user, locally on the user-operated device, e.g. using any user-perceivable signal, visual, audible, tactile, or remotely, e.g. the user-operated device sending a communication message indicative of the detected pattern and/or the determined problem and/or the required action to another network device.

In a further embodiment of the present invention the user-operated device further comprises means for detecting a misuse of the user-operated device in dependence of a comparison result of the actuation pattern with the predetermined pattern. Detection of an atypical usage pattern may also be used to indicate and/or prevent misuse of a user-operated device and thus allow to initiate appropriate counter measures like a notification to an admin, an alarm, local/switch off the device, etc.

In case the user-operated device is a resource rich device. Usage patterns can also be detected in the utilization of resource-rich devices, e.g. in modern day PC/smartphone/tablet, etc. If a resource rich device slows down, "stalls" (or "hangs"), e.g. due to processor being occupied with some large (background) process or program not responding, the communication throughput, in total or for a particular application, going down, the atypical usage pattern, e.g. frantic moving of the mouse, wild clicking with the mouse, clicking several times on an icon or miniaturized program window, typing nonsense character strings, very strong strokes on the keyboard, several (neighbouring) keys being strongly pressed at the same time, possibly indicating a first stroke against the keyboard, etc. can be used to determine the urgency of an repair action. Furthermore, gaze tracking (e.g. in a camera), may be used to determine what the user is interested in and can e.g. indicate problems with the program responsiveness (even before the systems detects it). Any further additional sensing modalities available at the resource-rich devices can be used as well to detect an atypical usage pattern, e.g. microphones, to detect user swearing, accelerometers, to detect violent movement. Another example of resource rich devices are (complex) electronically supported tools allowing for more than one user operation/usage pattern, like craftsmen tools (e.g. electric drills), medical measurement devices, and kitchen appliances.

A further example of resource rich devices could be (complex) electronic toys, edutainment devices or possibly a car.

In case of resource rich devices such devices may be further adapted to allocate device resources in dependence of the comparison result of the actuation pattern with the predetermined pattern to a task currently actively used by the user. Upon detection of an atypical usage pattern as described above, the resource rich device may allow dedicating remaining or freed up processing resources to the particular task the user is interested in or automatically restart the task, thus improving the performance towards the user. The corrective action can also be related to the communication interfaces, e.g. investigating the possibility and impact and/or executing the communication changes, such as negotiating higher bandwidth, reducing bandwidth consumption by other application, changing communication strategy (unicast/broadcast, with/without acknowledgement, etc.), changing communication channel (e.g. switching between wireless or wired interface, different wireless interfaces, wireless channels, wireless networks, different protocols, etc.). In case of resource rich devices the means for generating an acknowledgement indicator are adapted to provide user guidance in dependence of the comparison result of the actuation pattern with the predetermined pattern. As an example electronically supported tools allowing for more than one user operation/usage pattern, like craftsmen tools (e.g. electric drills), medical measurement devices, and kitchen appliances may upon detecting incorrect usage pattern automatically trigger self-diagnosis and/or may trigger instructions to the user.

In another aspect of the present invention there is provided a method for use in a wireless acknowledgement-based communication network for providing acknowledgement indicators performed by a user-operated device within a communication network. The method comprises detecting an actuation pattern of a user-operated device upon actuation of a user, comparing the detected actuation pattern with a predetermined pattern and generating an acknowledgement indicator in dependence of a comparison result of the actuation pattern with the predetermined pattern, wherein the user-operated device is a resource restricted device.

In another aspect of the present invention there is provided a computer program executable in an processing unit of the user-operated device, the computer program comprising program code means for causing the processing unit to carry out the method for providing acknowledgement indicators when the computer program is executed in the processing unit.

It shall be understood that the user-operated device of claim 1, the method of claim 6 and the computer program of claim 9 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments are now described based on a network containing one or more user-operated devices, e.g. resource restricted devices that can send messages by putting them into packets for wireless communication but are restricted in their ability to send many or long wireless packets, and restricted in their ability to listen for packets over long time periods or receive at all (e.g., devices powered by energy scavenging mechanisms), including resource restricted devices not capable of reception. Furthermore, the network contains one or more destination devices supposed to receive and act upon messages from the resource restricted device, wherein the messages may be encoded into one or more packets, and the encoding of the message in a packet may change on a hop-by-hop basis. The messages may be delivered in anycast, unicast, multicast, groupcast or broadcast communication mode. Furthermore, the system optionally comprises one or more proxy devices that help deliver messages from the resource restricted device beyond the (radio) range of the resource restricted device, and/or help delivering them in the required message format and/or a more reliable way by taking special actions (e.g., delivering the message onwards to a destination device, retransmitting the message to increase the reliability, etc.) when they receive a packet from a resource restricted device. Optionally, one or more router devices may be provided, that cannot act as a proxy device but can route messages sent by a proxy device towards a destination device. While the examples below use wireless network (primarily according to ZigBee Green Power protocol), the invention is not restricted to this kind of network and or user-operable devices. The communication may be using any communication protocol, including any wireless, wired, or optical communication.

Figure 1:
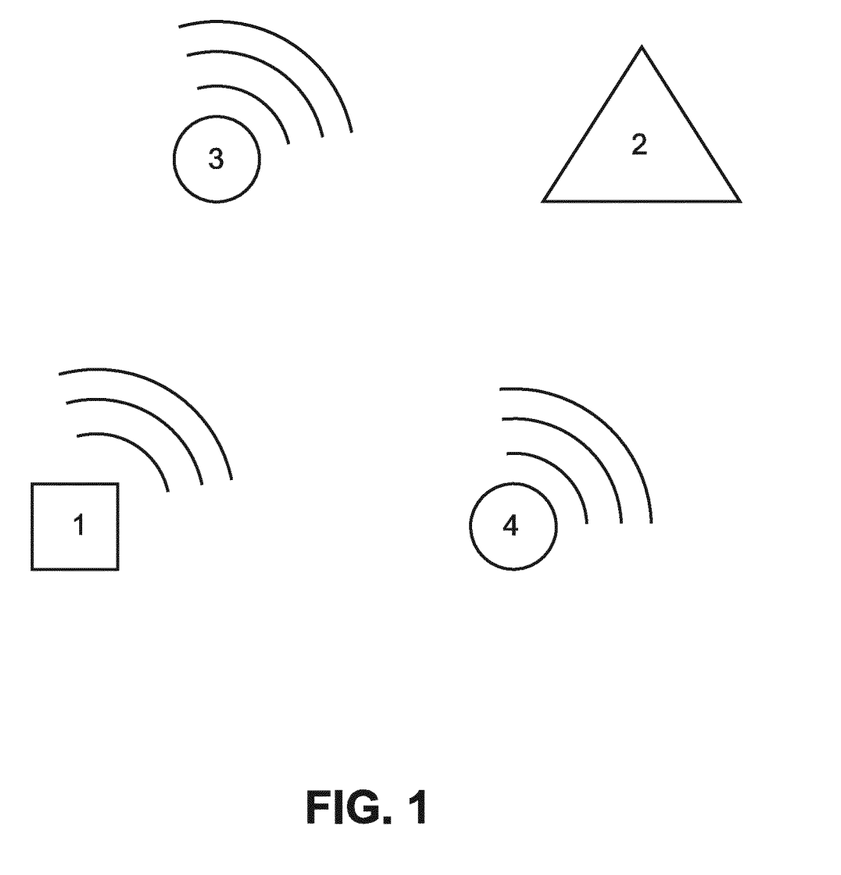
FIG. 1 shows a communication network in accordance with a preferred embodiment of the present invention.

FIG. 1 shows a wireless communication network (e.g. a network including devices supporting the ZigBee Green Power (ZGP) protocol) in which a user-operated device 1 communicates with a destination device 2. The communication may be relayed by optional proxy device 3 and/or optional router device 4. User-operated device 1 may be a resource restricted device, such as but not limited to a ZigBee Green Power Device (ZGPD), or a ZigBee End Device (ZED). Upon actuation by a user the user-operated device may send a command over the wireless network to perform some user-observable action. For instance, the user may want to turn on/off or dim the light, change light colour, select a scene upon watching a movie, open/close/lock/unlock a door/window/gate, trigger movement, e.g. a step of a conveyor belt, stop a conveyor belt, etc. Further actions may not be directly perceivable, like for instance increasing the temperature in the room, which requires some time to take effect. However, in these cases the user may receive some indirect feedback to the actuation of a user-operated device such as e.g. feedback on an in-room display, the sound of a ventilator starting/stopping, etc. Hence, in these examples a user usually only actuates the user-operated device according to a particular typical application usage pattern, e.g. for an on/off light switch: once during a certain interval of time. A typical usage pattern of the user-operated device being a light switch would thus be a single actuation within a certain interval time of a few seconds up to hours, days or weeks depending on the application. For instance, a light switch is usually used in big time intervals, in the evening to turn the light on, and couple of hours later to turn it off. Another example may be a cellar light which can be used for shorter duration, in the order of minutes, but at longer time intervals, in the order of days or even weeks. The light may also be used for a very short time, just to illuminate the room, in order to check or take something. If a light switch is used to dim the light, the push duration (time interval between push and release action) may vary considerably, or user may perform a series of actuations each corresponding to a dimming step.

In contrast to such a typical usage pattern, an atypical usage pattern may be, for example, if a particular user action is executed N times within a given time interval (e.g. 3 times within 2 seconds), which may indicate incorrect behaviour. If a user expects a real time system feedback in response to a single performed action (e.g. light to go on, door to open, etc.), and there is no reaction from the system, the user will likely retry. If there is still no reaction, the user will try once more and so on. Thus, depending on the user-operated device's application, an atypical or unintended usage pattern may be derived from typical or intended usage pattern, e.g. by specifying a more frequent and/or higher number of interactions. However, if the user-operated device is able to detect other parameters, they may also be used to determine an atypical usage pattern, e.g. the force and/or depth of a push of a button may increase, etc.

Since a given user-operated device can be used in multiple ways and environments, e.g. a light switch can be used either in an office, or at home in a room, or in a home cellar, the (a) typical behaviour may be defined such that it covers all possible use cases (e.g. the atypical push interval is smaller than that of any of the typical usage pattern etc.). Alternatively or in combination, the user-operated device may have the (a) typical behaviour defined for a number of intended usage modes, and the usage mode can be selected, e.g. by configuration, user interface means such as dip switches, special commissioning action, etc.

In order to detect an atypical usage pattern across multiple actuations, the user-operated device must be enabled to 'remember' previous actuations and/or be able to store the information about the current and future actuations. Detecting an atypical usage pattern often relies on detecting the time gap between subsequent actuations, e.g. detecting if the gap is smaller than some minimum time of e.g. 3 seconds. As an example of realizing the memory function related to this detection, a user-operated device might detect an atypical usage pattern by e.g. storing the number, frequency, time spacing, force, travel, and time stamp of the actuations. Another example is discussed below.

Instead of keeping a central microprocessor of the user-operated device running for at least 3 seconds, which would cost a lot of energy, a capacitor comprised in the user-operated device could be charged with some or all of the energy harvested upon user actuation. The capacitor may then be discharged at a desired rate e.g. using an appropriate resistor. The next time that the user-operated device is actuated, e.g. the button is pushed and the microprocessor is powered, the microprocessor can then measure the residual charge in the capacitor, e.g. via an A/D convertor to measure a voltage, and convert the residual power to an elapsed time. After a predetermined time gap without a further push of the button, e.g. 1 minute, the capacitor will be fully discharged or the residual charge may be below a defined threshold. The microprocessor will therefore not be able to measure the difference between 1 minute and 100 minutes between two consecutive pushes of a button, but this is not required for the intended detection of an atypical usage pattern. This capacitor may be the energy harvesting capacitor storing the energy harvested for the device operation, or may be a dedicated capacitor, used for the purpose of actuation pattern detection. The energy stored in such a dedicated capacitor can be all used up for the actuation pattern detection; alternatively, there may be ways of using it for other device operation, during or after particular actuation pattern determination. Furthermore, in order to put it in a defined initial state, e.g. after a timeout or after a particular condition is fulfilled, e.g. after a typical actuation pattern is identified (e.g. in a case when a typical pattern consists of multiple presses at particular time spacing), the capacitor has to be discharged. The stored energy may be used otherwise.

The atypical usage pattern may be treated as a negative acknowledgement for the communication process, and may indicate multipath fading or interference problems, network maintenance problems, e.g. channel changes, network identifier changes, node address changes, or security key changes, mobility-related problems, e.g. new location of the resource-restricted device or the node with/via which it was communicating, node absence, e.g. due to powering off, power failure, node (either the source device or its communication peer) being broken, etc., configuration changes, etc. As depicted in the state flow diagram in FIG. 2 the user-operated device may in response to the negative acknowledgement indicator trigger a special action which may be e.g. feedback to the user (e.g. visual, e.g. red LED, or acoustic, e.g. a buzzer, or tactile, e.g. a vibration), or triggering some maintenance actions (e.g. requesting an ACK, starting parent discovery, e.g. for the case that user-operated device, especially the resource-restricted device and/or its parent moved, starting network discovery, e.g. in case a channel, nodes address or network identifier changed, starting security exchange in case of security key changes; sending a pre-defined command, e.g. on a maintenance channel) and/or starting re-commissioning, etc.

Figure 2:
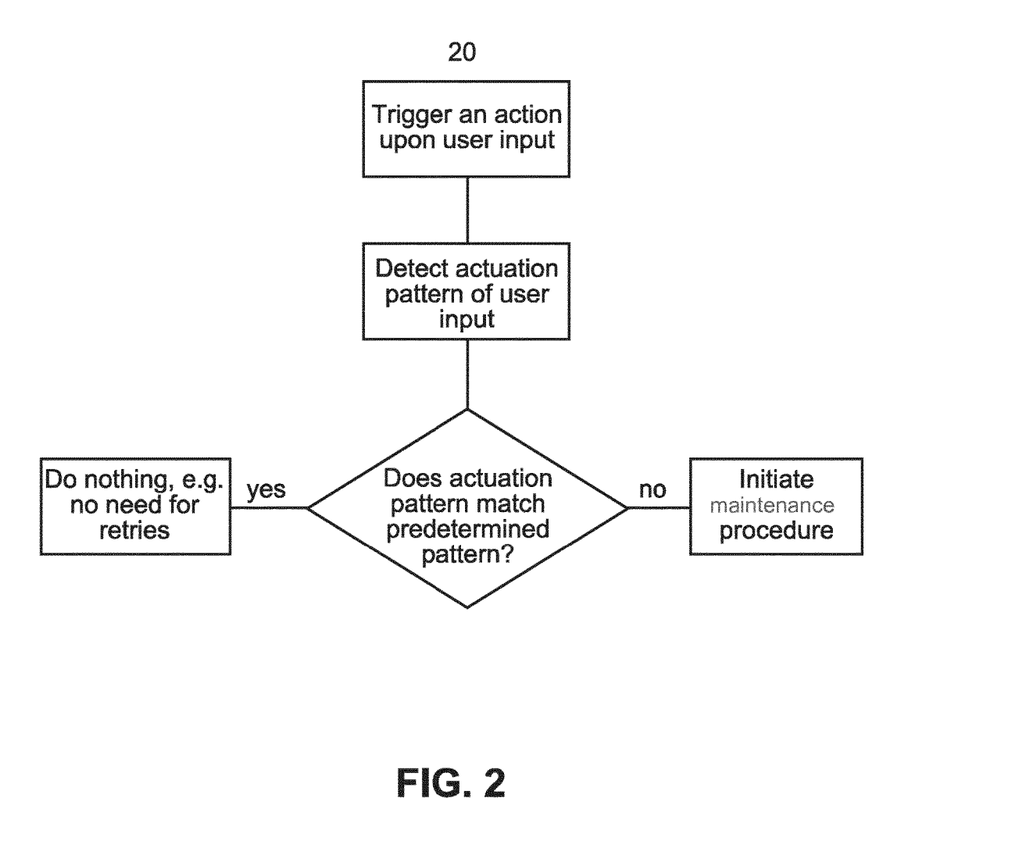
FIG. 2 shows a state flow diagram of a resource restricted device.

Conversely, if a user interaction is not identified as constituting an atypical usage pattern (or is part of the typical pattern as defined at the user-operated device as indicated in FIG. 2), the user-operated device may use this information to provide a positive acknowledgement or a confirmation. The user-operated device can refrain from performing a special action, or can refrain from retries, which require energy and unnecessarily occupy network resources etc. Especially, for resource restricted device a certain amount of redundant traffic is usually generated in order to guarantee that a command of a resource restricted device reaches its destination device; this redundant traffic (i.e. retries) may be skipped in that case.

Wherein described mainly with respect to energy-harvesting user-operated ZigBee Green Power Devices, the mechanism may also be used for other types of resource restricted devices, e.g. a sleeping ZigBee End Device, sleeping devices of any other wireless communication protocol, unidirectional communication devices of any other wireless communication protocol, unidirectional communication devices of visual light communication protocol, hybrid devices using different protocol and/or interface for reception and transmission, esp. if reception has a higher associated cost, in terms of energy, monetary cost or complexity\. The usage pattern detection and the resulting acknowledgement indicator can e.g. be used instead of periodic polling for or enabling the receiver to receive an acknowledgement message, to determine the presence (and unchanged configuration) of the (parent and the) network.

Further extensions of the described embodiment exploits the atypical usage pattern of a user-operated device as indication of the need for assistance of a user who may not understand the system, the operation of the device, the implications of the current state of the device or who may e.g. be confused. For instance, a single or subsequent execution of a series of steps within a particular application in the order 1, 3, 2 may comprise an atypical usage pattern and the device may indicate in response to the user that the steps should be executed in the order 1, 2 and 3, e.g. locking an alarm secured door, etc.

Another extension of the described embodiment exploits the atypical usage pattern of a user-operated device as indication of system misuse, e.g. when somebody willingly or by mistake is about to break a user-operated device. For example, the force by which a button is pressed could be measured: an unusually large force may indicate that the device is at risk of being broken. In a further embodiment the above described detection of an actuation pattern can also be used in resource-rich devices, e.g. in modern day PCs/smartphones/tablets, etc. If such a device slows down during normal operation, e.g. "stalls" or "hangs" this may due to processor occupancy, e.g. the processor being occupied with some large (background) process or program not responding. A typical reaction of the user could be used to identify an atypical user behaviour, such as—but not limited to—frantic moving of the mouse, wild clicking with the mouse, clicking several times on an icon or miniaturised program window, typing nonsense character strings, very strong strokes on the keyboard, several (neighbouring) keys being strongly pressed at the same time, possibly indicating a first stroke against the keyboard, etc. Furthermore, additional sensing modalities available at the resource-rich devices may be used, e.g. microphones, to detect user swearing, accelerometers to detect violent movement. Both may be used to determine the urgency of a repair action. Gaze tracking (e.g. in a camera) may be exploited to determine what the user is interested in. All input may be used to determine an atypicial usage pattern which may indicate problems with the program responsiveness (even before the systems detects it) or it may allow to dedicate the remaining or freed up processing resources to a particular task the user is interested in, thus improving the performance towards the user. Another action that may be triggered on the basis of the detected atypical usage pattern could be an automatic restart of the application the user is currently using or parts thereof. Again, a vast variety of use cases are possible depending on a specific application, providing a typical usage pattern and/or an atypical usage pattern and trigger a corresponding action if either the actual usage pattern matches the usage pattern or differs from the typical/atypical usage patterns.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A resource restricted user-operated device providing control commands over a wireless acknowledgement-based communication network to a destination device upon actuation by a user wherein the resource restricted user-operated device receives user input to trigger a user-perceivable reaction of the user-operated device or a system controlled by it, the resource restricted user-operated device comprising:

a detector configured to detect an actuation pattern of the user-operated device upon actuation of a user;
a processing unit, wherein the processing unit is configured to:
   compare the detected actuation pattern with a predetermined pattern;
   generate an acknowledgement indicator for transmission to the wireless acknowledgement-based communication network indicative of a successful or unsuccessful transmission of a previously sent control command to the destination device in dependence of a comparison result of the actuation pattern with the predetermined pattern; and
wherein the detector comprises a capacitor adapted to store energy harvested during actuation of the user-operated device by a user and to discharge at a predetermined rate; wherein the detector is further adapted to determine a residual charge in the capacitor upon actuation by a user; and wherein the processing unit is further configured to generate the acknowledgement indicator in dependence of a value of the residual charge.

2. The resource restricted user-operated device according to claim 1, wherein the predetermined pattern represents an atypical user interaction and wherein the processing unit is adapted to trigger a maintenance action to recover from communication failures if the actuation pattern matches the predetermined pattern.

3. The resource restricted user-operated device according to claim 1, wherein the predetermined pattern represents a typical user interaction and wherein the processing unit is adapted to trigger a maintenance action to recover from communication failures if the actuation pattern does not match the predetermined pattern.

4. The resource restricted user-operated device according to claim 1, wherein the processing unit is further configured to detect a misuse of the user-operated device in dependence of a comparison result of the actuation pattern with the predetermined pattern.

5. A method performed by a resource restricted user-operated device providing control commands over a wireless acknowledgement-based communication network to a destination device upon actuation by a user, the method comprising:

detecting an actuation pattern of a user-operated device upon actuation of a user;
comparing the detected actuation pattern with a predetermined pattern;
generating an acknowledgement indicator for transmission to the wireless acknowledgement-based communication network indicative of a successful or unsuccessful transmission of a previously sent control command to the destination device in dependence of a comparison result of the actuation pattern with the predetermined pattern;
wherein the detector step comprises stores energy harvested during actuation of the user-operated device by a user and to discharge at a predetermined rate and determines a residual charge in the capacitor upon actuation by a user; and
generating the acknowledgement indicator in dependence of a value of the residual charge.

6. The method according to claim 5, wherein the predetermined pattern represents an atypical user interaction and wherein generating an acknowledgement indicator comprises triggering a maintenance action to recover from communication failures if the actuation pattern matches the predetermined pattern.

7. The method according to claim 5, wherein the predetermined pattern represents a typical user interaction and wherein generating an acknowledgement indicator comprises triggering a maintenance action to recover from communication failures if the actuation pattern does not match the predetermined pattern.

8. A computer- readable, non-transitory medium having stored therein instructions for causing a processing unit to execute a method performed by a resource restricted user-operated device providing control commands over a wireless acknowledgement-based communication network to a destination device upon actuation by a user, the medium comprising code for:

detecting an actuation pattern of a user-operated device upon actuation of a user;
comparing the detected actuation pattern with a predetermined pattern;
generating an acknowledgement indicator for transmission to the wireless acknowledgement-based communication network indicative of a successful or unsuccessful transmission of a previously sent control command to the destination device in dependence of a comparison result of the actuation pattern with the predetermined pattern;
wherein the detector step comprises stores energy harvested during actuation of the user-operated device by a user and to discharge at a predetermined rate and determines a residual charge in the capacitor upon actuation by a user; and generating the acknowledgement indicator in dependence of a value of the residual charge claim 1.

* * * * *